No. 871,722.
PATENTED NOV. 19, 1907.
W. J. MILLICAN.
AMUSEMENT DEVICE.
APPLICATION FILED APR. 16, 1907.
3 SHEETS—SHEET 1.
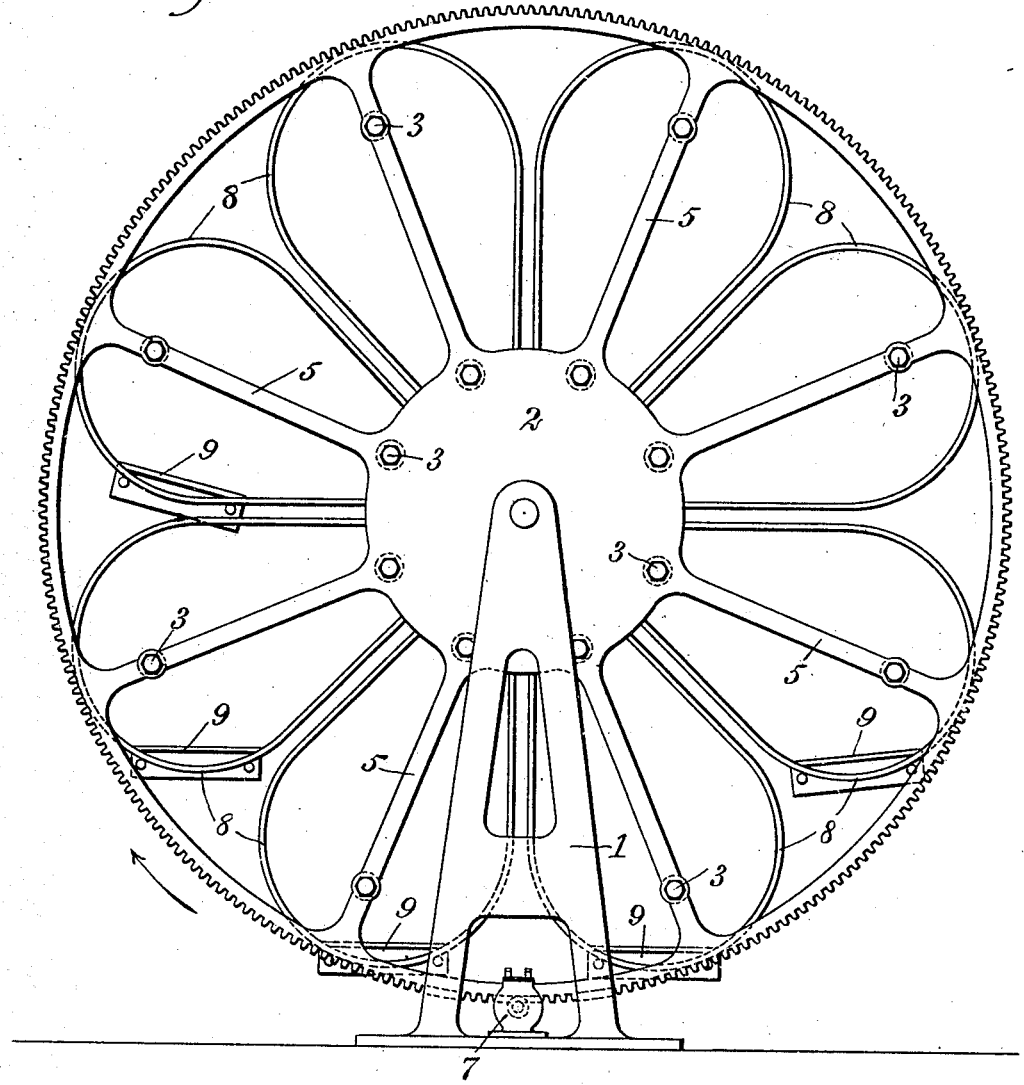
Fig. 1.
Fig. 4.
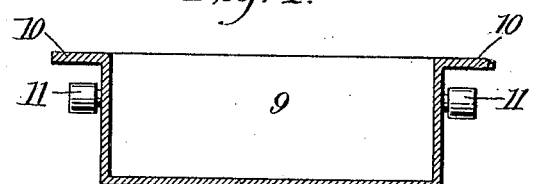
WITNESSES
Edward Thorpe.
INVENTOR
William J. Millican
BY Munn & Co
ATTORNEYS.

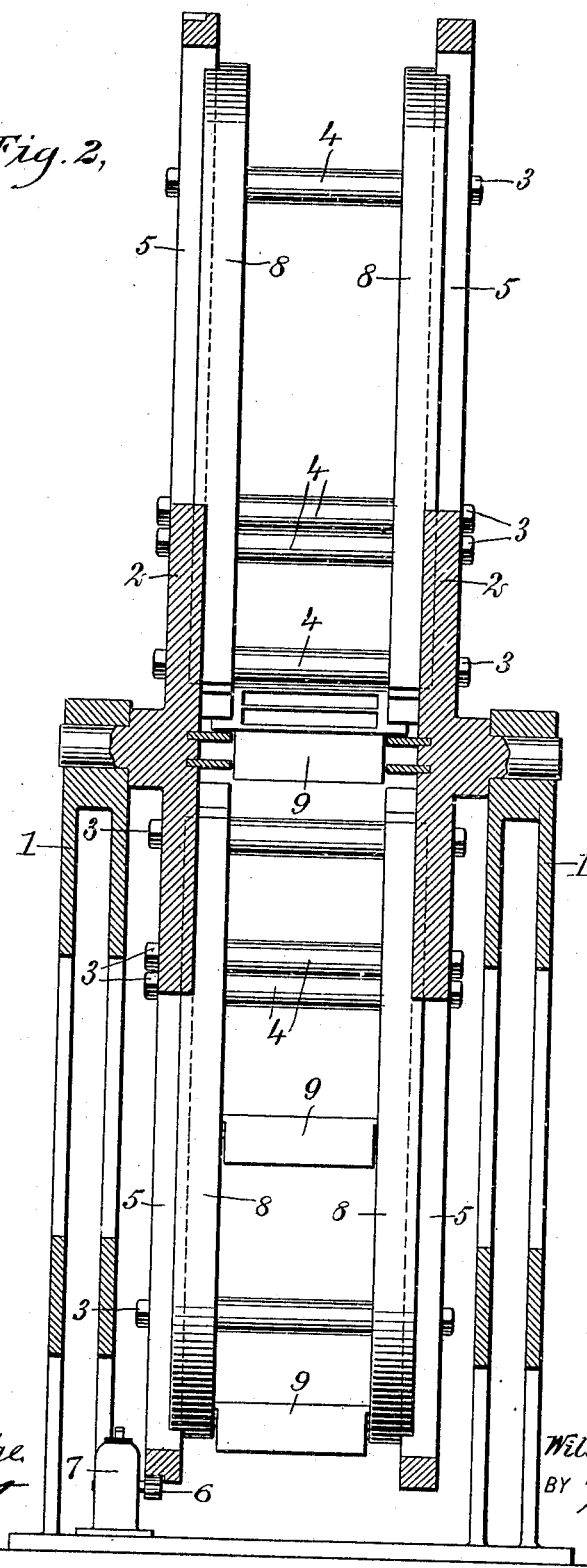

No. 871,722.       PATENTED NOV. 19, 1907.
W. J. MILLICAN.
AMUSEMENT DEVICE.
APPLICATION FILED APR. 16, 1907.
3 SHEETS—SHEET 3.
Fig. 3,
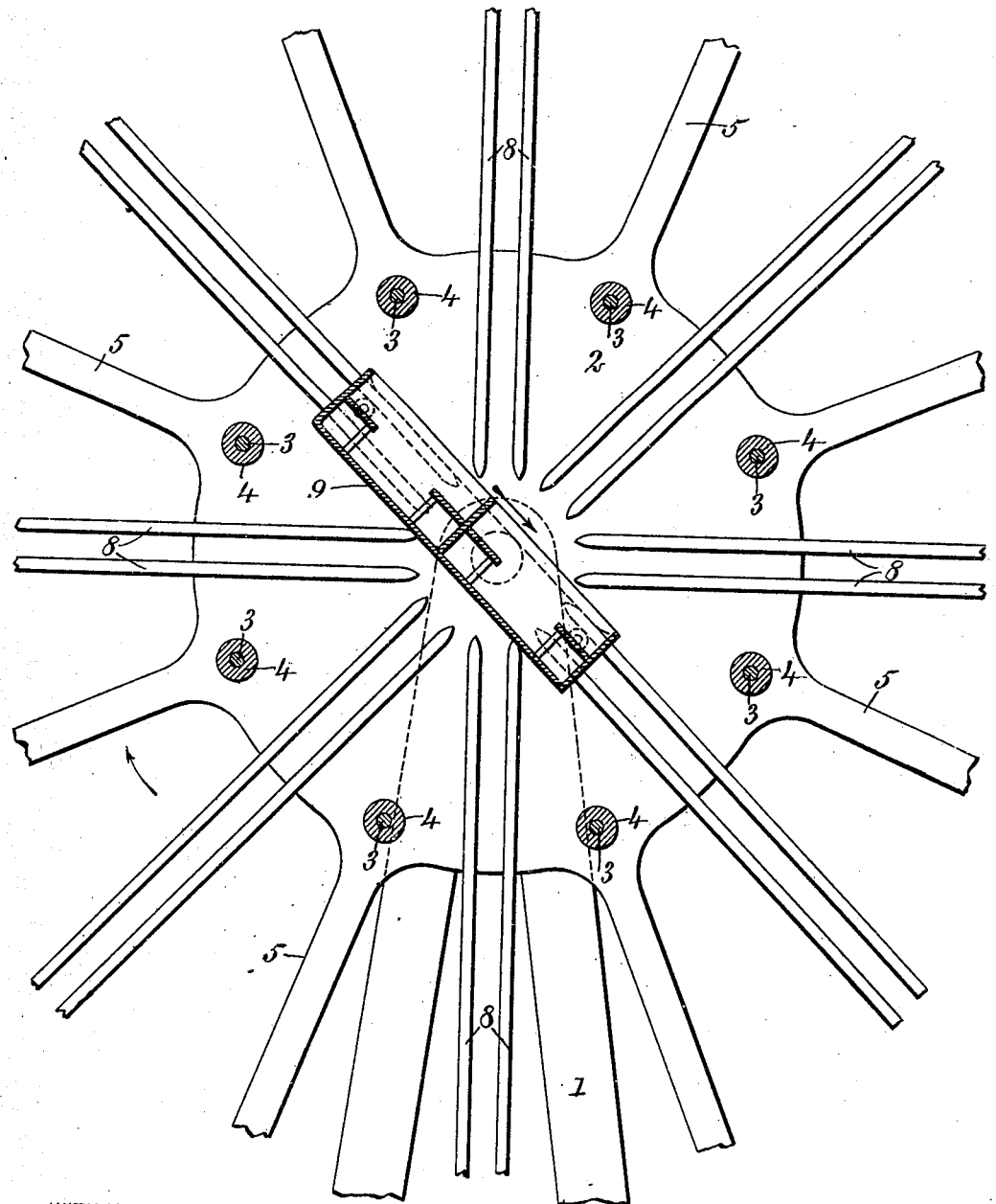
WITNESSES
Edward Thorpe.
INVENTOR
William J. Millican
BY Munn & Co
ATTORNEYS.

UNITED STATES PATENT OFFICE.

WILLIAM J. MILLICAN, OF NEW YORK, N. Y.

AMUSEMENT DEVICE.

No. 871,722.      Specification of Letters Patent.      Patented Nov. 19, 1907.

Application filed April 16, 1907. Serial No. 368,510.

*To all whom it may concern:*

Be it known that I, WILLIAM J. MILLICAN, a citizen of the United States, and a resident of the city of New York, Flatbush, borough of Brooklyn, county of Kings, and State of New York, have invented a new and Improved Amusement Device, of which the following is a full, clear, and exact description.

This invention has reference to a novel amusement device embodying features of both a toboggan slide and an ordinary amusement wheel by which one is elevated a considerable distance above the surface of the ground as the wheel revolves.

The invention has for an object the provision of a device of this character in which a car or like body will repeatedly travel through the hub of the wheel under the influence of gravity as the wheel revolves.

Reference is to be had to the accompanying drawings forming a part of this specification, in which similar characters of reference indicate corresponding parts in all the figures.

Figure 1 is a side elevation of an amusement device embodying my invention; Fig. 2 is a central, vertical section of the same; Fig. 3 is an inside view of one-half of the hub of the wheel on an enlarged scale, and Fig. 4 is a cross section through one of the cars.

More specifically stated, one form of my invention as illustrated in the accompanying drawings, includes standards or supports 1 of suitable construction, in the upper ends of which is journaled a wheel composed of circular side-frames 2 which are spaced apart and rigidly connected together by cross-bolts 3, respectively circularly arranged near the hub and near the circumference of the wheel, each cross-bolt having a spacing thimble or sleeve 4 interposed between the side frames for holding them in proper spaced relation. Each frame 2 is provided with a series of radiating spokes 5 joining the hub portion and circumference of the wheel together, and through which the outer circle of the bolts 3 pass, the circumference of one of said frames being constructed with teeth, adapting the wheel to be driven therefrom by an intermeshing gear 6 carried on the driving shaft of a suitable motor 7.

To the inside of the frames 2 of the wheel are secured by any desired means a series of loops 8, each loop being centrally disposed with respect to the spokes 5 and converging toward the center of the wheel but falling short a slight distance thereof, leaving a clear space directly at the wheel's center. The loops, as well as the spokes of the wheel, are of even number, which throws the opposed ends of a loop in direct alinement with the like ends of the loop arranged at the opposite side of the wheel.

Carried on each set of oppositely-arranged loops is a car 9 having a suitable seating capacity and constructed with oppositely outwardly turned flanges 10 under which at each side and near the opposite ends of the car are provided rollers or pins 11. These flanges and rollers, as clearly shown in Figs. 1 and 3, engage, respectively, on the upper and under faces of the loops and thus prevent the separation of the car from the wheel. The straight sides of the loops passing to the hub of the wheel are spaced from the next adjacent loop a sufficient distance to provide for the clearance of the rollers 11; also the extremities of these sides are preferably beveled off, as shown in Fig. 3, in order that there will be no hitch in passing the car through the hub of the wheel from one loop to another.

In the operation of the amusement device, as the wheel revolves, the several cars travel about the loops under the action of gravity, tending to at all times maintain a horizontal position. As each loop of the wheel passes therewith from a substantially horizontal position at one side of the wheel to a like position at the opposite side, the curved position thereof is traversed by its respective car. The movement of the wheel beyond this point carries the lower portion of the loop to an inclined position and the car under the influence of gravity, shoots through the hub of the wheel to the directly opposed loop, the speed of the car being checked as it strikes the curved portion of the loop at the bottom. This action is successively repeated by each car as the wheel revolves, thus affording not only the pleasure of traveling to an elevated position on the wheel, but also the pleasure incident to the rapid travel through the hub of the wheel.

It is apparent that various changes in the construction of the wheel may be resorted to within the scope of my invention as defined in the claims annexed.

Having thus described my invention I claim as new and desire to secure by Letters Patent:

1. In an amusement device, the combination of a wheel, a car carried by the wheel, and means for directing the car through the hub of the wheel.

2. In an amusement device, the combination of a wheel, a car carried by the wheel, means for rotating the wheel, and means for directing the car through the hub of the wheel as the wheel is rotated.

3. In an amusement device, the combination of a wheel, a car carried by the wheel, means for rotating the wheel, and means for directing the car substantially diametrically through the hub of the wheel as the wheel is rotated.

4. In an amusement device, the combination of a wheel having opposed loops, a car slidably mounted on said loops, and means for rotating the wheel whereby the car travels through the hub thereof on said loops.

5. In an amusement device, the combination of a wheel composed of two circular side frames spaced apart and rigidly connected together, directly opposed loops carried by said frames converging toward the center of the wheel, a car slidably mounted on said loops, and means for rotating the wheel whereby the car repeatedly slides through the hub thereof on said loops.

6. In an amusement device, the combination of a wheel, alining loops carried by the wheel converging toward the center thereof, a car carried by the loops, and means for revolving the wheel, whereby the car will repeatedly slide through the hub thereof on said loops.

7. In an amusement device, the combination of two directly opposed loops converging toward a common center, a car carried by said loops, and means for revolving said loops about said center.

8. In an amusement device, the combination of a series of loops equal in number and converging toward a common center, a car carried by each pair of directly opposed loops, and means for revolving said loops about said center.

9. In an amusement device, the combination of a wheel, a series of directly opposed loops carried by the wheel and converging to the center thereof, a car carried by each pair of directly opposed loops, and means for revolving the wheel whereby the cars will successively and repeatedly travel under the action of gravity through the hub of the wheel on said loops.

10. In an amusement device, the combination of a wheel consisting of two side frames rigidly connected together, directly opposed loops converging to the center of the wheel fixed to each side frame, a car movably mounted on said loops between said side frames, and means for revolving the wheel whereby the car will slide through the hub of the wheel from one loop to the other.

In testimony whereof I have signed my name to this specification in the presence of two subscribing witnesses.

WILLIAM J. MILLICAN.

Witnesses:
W. W. HOLT,
JOHN P. DAVIS.